(12) United States Patent
Habib

(10) Patent No.: US 6,230,027 B1
(45) Date of Patent: *May 8, 2001

(54) METHOD OF ISSUING A TIME INFORMATION SIGNAL VIA A SATELLITE STATION OF A TRANSMISSION SYSTEM

(75) Inventor: Elia Habib, Le Mans (FR)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/078,232

(22) Filed: May 13, 1998

(30) Foreign Application Priority Data

Jun. 17, 1997 (FR) .................................................. 97 07508

(51) Int. Cl.⁷ ..................................................... H04Q 7/20
(52) U.S. Cl. ........................................... 455/566; 455/466
(58) Field of Search ............................. 455/427, 70, 552, 455/553, 566, 466, 230, 231, 31.1, 31.2, 31.3, 32.1, 68; 368/47, 10, 46, 49; 340/825.2, 825.4

(56) References Cited

U.S. PATENT DOCUMENTS

| | | | |
|---|---|---|---|
| 4,204,167 | * | 5/1980 | Liu ......................................... 455/231 |
| 4,466,130 | * | 8/1984 | Sewerinson ........................... 455/260 |
| 4,926,446 | * | 5/1990 | Grover et al. ........................ 375/358 |
| 5,105,396 | * | 4/1992 | Ganter et al. ........................... 368/47 |
| 5,347,562 | * | 9/1994 | Candy .................................... 370/280 |
| 5,363,377 | * | 11/1994 | Sharpe ................................... 370/314 |
| 5,367,524 | * | 11/1994 | Rideout, Jr. .......................... 342/357 |
| 5,448,533 | * | 9/1995 | Owen ...................................... 368/47 |
| 5,548,811 | * | 8/1996 | Kumagai et al. .................. 455/192.2 |
| 5,590,092 | | 12/1996 | Fehnel .................................... 368/10 |
| 5,712,867 | * | 1/1998 | Yokev et al. ......................... 375/202 |
| 5,740,129 | * | 4/1998 | Frampton ................................. 368/6 |
| 5,774,057 | * | 6/1998 | Kalbermatter ................... 340/825.21 |
| 5,943,606 | * | 8/1999 | Kremm et al. ...................... 455/12.1 |
| 5,995,846 | * | 11/1999 | Jakobsen .............................. 455/566 |

FOREIGN PATENT DOCUMENTS

| | | |
|---|---|---|
| 59-64939 | 4/1984 | (JP) . |
| WO9116670 | 10/1991 | (WO) ............................ G04C/11/02 |

OTHER PUBLICATIONS

ETACS Standard: Extended Total Access Communications Systems, —Mobile Station Land Station Compatibility Specification Issue 4—Amendment 2—Feb. 1995.

AMPS Standard: Mobile Station—Base Station Compatibility Standard for 800 MHZ Analog Cellular—TIA/EIA/IS–91.

* cited by examiner

Primary Examiner—Nay Maung
Assistant Examiner—Jean A Gelin
(74) Attorney, Agent, or Firm—Dicran Halajian

(57) ABSTRACT

A transmission system is disclosed having a base station and a satellite station. A transmitter of the base station transmits a time information signal. The base station transmitter is activated for a period of time which is shorter than or equal to the precision with which the time information is issued.

18 Claims, 2 Drawing Sheets

Local Control 1

| T1 T2 (2 bits) | DCC (2 bits) | ACT (4 bits) | LOCAL CONTROL (16 bits) | END (1 bit) | OHD (3 bits) | P (12 bits) |
|---|---|---|---|---|---|---|
| | | | | | | |

Local Control 2

| T1 T2 | DCC | ACT | LOCAL CONTROL | END | OHD | P |
|---|---|---|---|---|---|---|
| | | | | | | |

METHOD OF ISSUING A TIME INFORMATION SIGNAL VIA A SATELLITE STATION OF A TRANSMISSION SYSTEM

FIELD OF THE INVENTION

The invention relates to a transmission system for transmitting information signals of a first type, said system comprising at least a base station including transmission means for transmitting to at least one satellite station at least one information signal of a second type which is a time information signal.

The invention also relates to a base station including transmission means for transmitting information signals of a first and a second type to at least one satellite station, the information signals of the second type being time information signals, and also relates to a satellite station intended to exchange information signals of a first type with a base station and which satellite station includes a device for issuing information signals of a second type, the information signals of said second type being time information signals.

The invention likewise relates to a "Local Control" message as defined by the ETACS and AMPS standards.

The invention finally relates to a method of issuing at least one information signal of a first type called time information by a satellite station intended to exchange information signals of a second type with a base station, and also to a method of transmitting a time information signal from a radio base station to a mobile radio station of a radio communications network.

BACKGROUND OF THE INVENTION

Japanese patent abstract no. 59-64939 describes a mobile radio system in which a radio base station transmits a time information signal to a mobile radio station. This time information signal is used for correcting an internal clock of the mobile radio station.

The use of an internal clock in a mobile radio station presents the drawback of taking up space and consuming energy, which reduces the time during which the station can operate autonomously. The cumbersomeness and the time during which mobile radio stations can operate autonomously are two essential criteria for the choice of the clients. It is thus particularly important to optimize these items.

SUMMARY OF THE INVENTION

Therefore, a transmission system according to the invention and as defined in the opening paragraph is characterized in that, whereas said time information is defined with a certain precision, said base station comprises means for activating said transmission means for a period of time shorter than or equal to said precision, and said satellite station comprises display means for displaying time information transmitted by said base station.

A base station according to the invention is characterized in that, whereas said time information signals are defined with a certain precision, said base station comprises means for activating said transmission means for a period of time shorter than or equal to said precision.

A satellite station according to the invention is characterized in that the device for issuing time information signals comprises:

means for receiving time information signals defined with a certain precision and transmitted by said base station for a period of time shorter than or equal to said precision, display means for displaying received time information signals.

And a display method according to the invention and as described in the opening paragraph is characterized in that, whereas said time information signals are defined with a certain precision, the method comprises:

periodically transmitting a time information signal from the base station to the satellite station for a period of time shorter than or equal to said precision, displaying the time information signals received by the satellite station on the display of said satellite station.

When said system is a radio communications system according to a standard of the ETACS or AMPS type, said time information signal is advantageously transmitted in a message entitled Local Control defined in said standards.

In accordance with these ETACS standards, the base radio stations of a radio telecommunications network issue messages called Local Control messages to the mobile radio stations which are located in their coverage area, whereas the use of these messages is not defined by the standard. These messages are not actually used by the network operators. The invention in this respect proposes here a particularly interesting application.

These and other aspects of the invention will be apparent from and elucidated with reference to the embodiments described hereinafter.

DETAILED DESCRIPTION OF THE INVENTION

Now there will be described an example of an implementation of the invention with respect to a mobile radio communications system according to an ETACS or AMPS standard. The invention, however, is not restricted to this example of embodiment. It applies, for example, to a cordless telephony system comprising a base radio station and one or more handsets. It is also applicable to other standards of mobile radio communications.

In the description, reference is made for simplicity to the ETACS or AMPS standards. The exact references of these standards are:

ETACS standard: Extended Total Access Communications Systems,—Mobile Station-Land Station Compatibility Specification Issue 4—Amendment 2—February 95", AMPS standard: Mobile Station-Base Station Compatibility Standard for 800 MHz Analog Cellular—TIA/EIA/IS-91.

Figures 1, 2:
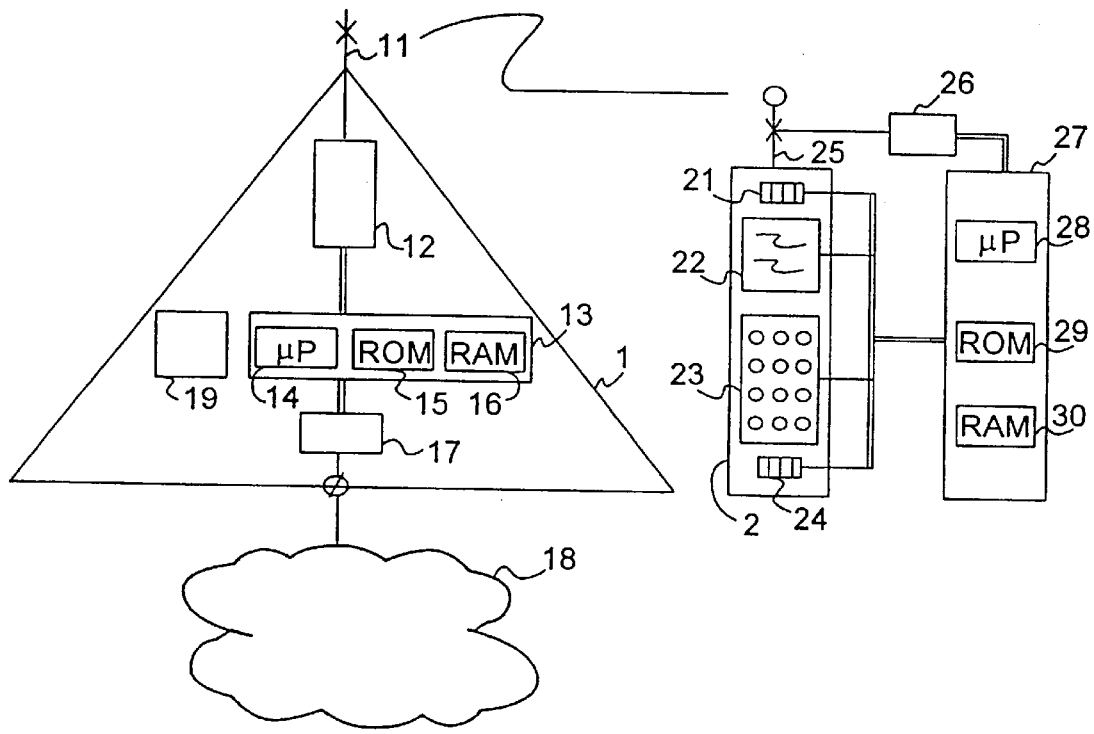
FIG. 1 represents an example of a transmission system according to the invention, FIG. 2 gives the format of a Local Control message defined in the ETACS standard.

In FIG. 1 is shown diagrammatically an example of a radio communications network which comprises notably a base radio station 1 and a satellite station 2 currently called mobile radio station.

The base radio station 1 notably comprises an antenna 11 connected to a transceiver device 12 which is controlled by a microprocessor assembly 13. This microprocessor assembly 13 comprises an actual processor 14, a read-only memory 15 which contains the instructions necessary for the operation of the radio base station, and notably those necessary for implementing the invention, and a random-access memory 16. The microprocessor assembly 13 is also connected to connection means 17 for connecting to the network 18 of an operator and a clock circuit 19 which is formed, for example, on the basis of a quartz crystal.

The mobile radio station 2 notably comprises an earphone 21, a display 22, a keyboard 23, a microphone 24 and an antenna 25. The antenna 25 is connected to a transceiver device 26 which is controlled by a microprocessor assembly 27. This microprocessor assembly 27 comprises an actual processor 28, a read-only memory 29 which contains the instructions necessary for the operation of the mobile radio station and notably those necessary for implementing the invention, and a random-access memory 30. It is connected to the earphone 21, to the display 22, to the keyboard 23 and to the microphone 24 by a bus 31 and particularly manages the display of information signals on the display 22.

By way of non-limiting example, the microprocessor assemblies 13 and 27 are the respective processors 68000 by Motorola and 8051 by Intel.

The invention has for its object to supply the user of the mobile radio station with a time information signal, for example, the time expressed in hour/minute, without the necessity of introducing an internal clock in the mobile station. Therefore, the base radio stations of the radio communications network include means for periodically transmitting the time information signal to the known mobile radio stations in their coverage areas. The transmission period is chosen so as to be smaller than or equal to the precision with which the time information is issued. For example, if the time information is expressed in hour/minute, the transmission period of this information is to be shorter than or equal to 1 minute. If the information is expressed in hour/minute/second, the transmission period is to be smaller than or equal to 1 second. Thus, the information issued by the mobile radio station is always exact.

In a particularly advantageous embodiment, this time information is transmitted in a Local Control message which is notably defined by the ETACS standard.

The format of such a message is represented in FIG. 2. It is formed by two messages called Local Control 1 and Local Control 2. Each of these messages comprises:

three headers T1T2, DCC and ACT which contain 2, 2 and 4 bits respectively, a 16-bits LOCAL CONTROL field used for transmitting the desired information, three end fields END, OHD and P which contain 1, 3 and 12 bits respectively. The use and the values of these various fields are described in detail in the standard stated above.

The messages Local Control thus permit of the transmission of whatever information which is up to the operator to choose, coded in 32 bits. Thus there is ample space for transmitting other time information than the time of day, for example, the date (day/month/year), the charging rate (full rate or reduced rate depending on time), or even for transmitting information signals of a different type, for example, temperature . . .

By way of example, for transmitting the time of day and the date, one uses in the following order starting with the least significant bits:

six bits for transmitting the minutes, five bits for transmitting the hours, five bits for transmitting the days, four bits for transmitting the months, and seven bits for transmitting the year.

Figure 3:
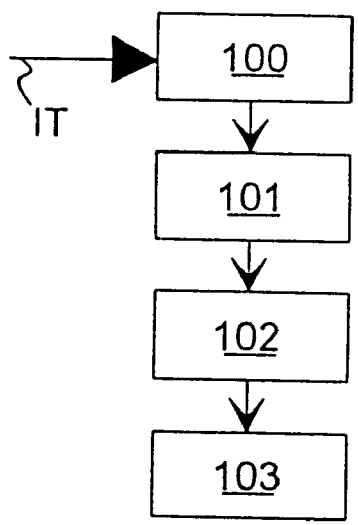
FIG. 3 is a diagram indicating the main steps of a method of transmitting a time information signal according to the invention.

In FIG. 3 is diagrammatically shown a method of transmitting a time information signal according to the invention. The processor 14 periodically receives an interruption IT (box 100) at the end of which it carries out the following operations:

reading the time information signal contained in the clock circuit 19 (box 101), forming a Local Control message which contains this information signal (box 102), issuing said message to all the mobile radio stations which are connected to the base radio station (box 103).

Figure 4:
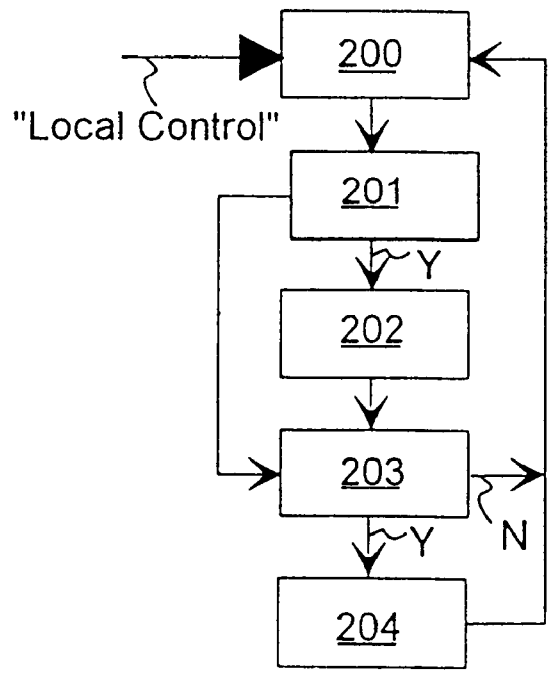
FIG. 4 is a diagram indicating the main steps of a method of issuing a time information signal according to the invention.

In FIG. 4 is diagrammatically shown a method of issuing a time information signal according to the invention. In conventional manner, the mobile station has a menu which permits the user to adjust various parameters, activate or deactivate certain options . . . . In an advantageous embodiment of the invention, the user is thus permitted to activate or deactivate the display of one or various information signals received in a Local Control message (hour, date, charging rate per-hour, for example).

In the following of the description, the Local Control messages are considered to transmit two time information signals: the date and the time. In box 200, the mobile radio station is in the standby mode. When it receives a Local Control message, it carries out the following operations:

in box 201 it first of all carries out the first test to determine whether the user has selected the option of displaying the time;

if this is the case (arrow Y) the station processes the contents of the LOCAL CONTROL field of the received message to extract therefrom the time which is then displayed on the display 22 (box 202); after which it proceeds with this operation to box 203;

if not (arrow N), it directly carries on with its operation at box 203;

in box 203 it carries out a second test to determine whether the user has selected the option of displaying the date;

if this is the case (arrow Y), the station processes the contents of the LOCAL CONTROL field of the received message to extract therefrom the date which is then displayed on screen 22 (box 204); then it returns to the standby mode;

if not (arrow N),it returns to the stanby mode (box 200).

Obviously, the invention is not restricted to the embodiments which have just been described by way of example. Notably, there is considered that the base station transmitted two time information signal to the mobile station. This number is not restrictive, and information signal of one or various other types are also suitable for transmission.

What is claimed is:

1. A transmission system comprising:

a satellite station; and a base station which transmits time information to said satellite station; wherein said satellite station receives said time information for use as successive satellite time information; said satellite station not updating said successive satellite time information using means internal to said satellite station so that energy consumption of said satellite station is reduced; wherein said successive satellite time information has a precision and said base station transmits said time information with a periodicity which is shorter or equal to said precision.

2. The transmission system of claim 1, wherein said satellite station does not include an internal clock circuit.

3. The transmission system of claim 1, wherein said periodicity is shorter but not equal to said precision.

4. The transmission system of claim 1, wherein said transmission system is a radio communication system according to ETACS or AMPS standard, and wherein said time information signal is transmitted in a Local Control type message defined in said ETACS or AMPS standard.

5. A base station comprising:

transmission means for transmitting time information to a satellite station for use as successive satellite time information having a precision; and control means for activation said transmission means with a periodicity which is shorter or equal to said precision so that said satellite station does not update said successive satellite time information using means internal to said satellite station in order to reduce energy consumption of said satellite station.

6. The base station of claim 5, wherein said base station is part of a radio communication system according to ETACS or AMPS standard, and wherein said time information signal is transmitted in a Local Control type message defined in said ETACS or AMPS standard.

7. A satellite station comprising reception means for receiving time information from a base station for use as successive satellite time information; said satellite station not updating said successive satellite time information using means internal to said satellite station so that energy consumption of said satellite station is reduced; wherein said successive satellite time information has a precision and said base station transmits said time information with a periodicity which is shorter or equal to said precision.

8. The satellite station of claim 7, wherein said satellite station does not include an internal clock circuit.

9. The satellite station of claim 7, wherein said periodicity is shorter but not equal to said precision.

10. The satellite station of claim 7, wherein said satellite station is part of a radio communications system according to ETACS or AMPS standard, and wherein said time information signal is received in a Local Control type message defined in said ETACS or AMPS standard.

11. The satellite station of claim 7, wherein said satellite station does not generate any time information between said successive satellite time information.

12. A mobile radio station comprising reception means for receiving time information from a base station for use as successive satellite time information; said mobile radio station not updating said successive satellite time information using means internal to said mobile radio station so that energy consumption of said mobile radio station is reduced; wherein said successive satellite time information has a precision and said base station transmits said time information with a periodicity which is shorter or equal to said precision.

13. The mobile radio station of claim 12, wherein said mobile radio station does not include an internal clock circuit so that space requirement of said mobile radio is reduced.

14. The mobile radio station of claim 12, wherein said periodicity is shorter but not equal to said precision.

15. The mobile radio station of claim 12, wherein said mobile radio station is part of a radio communications system according to ETACS or AMPS standard, and wherein said time information signal is received in a Local Control type message defined in said ETACS or AMPS standard.

16. A method of communicating between a base station and a satellite station including transmitting time information from said base station to said satellite station; wherein said satellite station receives said time information for use as successive satellite time information; said satellite station not updating said successive satellite time information using means internal to said satellite station so that energy consumption of said satellite station is reduced; wherein said successive satellite time information has a precision; and the transmitting act is performed with a periodicity which is shorter or equal to said precision.

17. The method of claim 16, wherein said periodicity is shorter but not equal to said precision.

18. The method of claim 16, wherein said base station and said satellite station are part of a radio communication system according to ETACS or AMPS standard, and wherein said time information signal is transmitted in a Local Control type message defined in said ETACS or AMPS standard.

* * * * *